United States Patent [19]

Barnhard, IV

[11] 3,730,289
[45] May 1, 1973

[54] SEISMOGRAPHIC DEVICE
[76] Inventor: Philip Barnhard, IV, 1062 Dunvegan Drive, West Chester, Pa. 19380
[22] Filed: Sept. 18, 1970
[21] Appl. No.: 73,436

[52] U.S. Cl. .......... 181/0.5 NC, 181/0.5 XC, 340/8 R
[51] Int. Cl. ............................................... G01v 1/06
[58] Field of Search ................. 181/0.5 NC, 0.5 XC; 340/8 R

[56] References Cited

UNITED STATES PATENTS

| | | | |
|---|---|---|---|
| 3,447,625 | 6/1969 | Balashkand | 181/0.5 |
| 3,360,070 | 12/1967 | Cholet et al. | 181/0.5 NC |
| 3,099,813 | 7/1963 | Anderson | 181/0.5 NC |
| 3,064,753 | 11/1962 | McClure | 181/0.5 NC |
| 3,444,953 | 5/1969 | Cholet et al. | 181/0.5 NC |
| 3,493,072 | 2/1970 | Johnston | 340/8 R |

OTHER PUBLICATIONS

Seismic Energy Source Handbook 1968 by Bendix-United Geophysical Corp.

Primary Examiner—Benjamin A. Borchelt
Assistant Examiner—H. A. Birmiel
Attorney—Connolly and Hutz

[57] ABSTRACT

An underwater seismographic device for surveying or prospecting without the use of bubble formation comprises a vessel having a constricted orifice with an area of about 5 percent to about 20 percent of the maximum cross-sectional area of the vessel. The combustion gases escape through the orifice and the shock wave used for seismographic prospecting passes through the wall of the vessel.

14 Claims, 10 Drawing Figures

Patented May 1, 1973 3,730,289
2 Sheets-Sheet 1
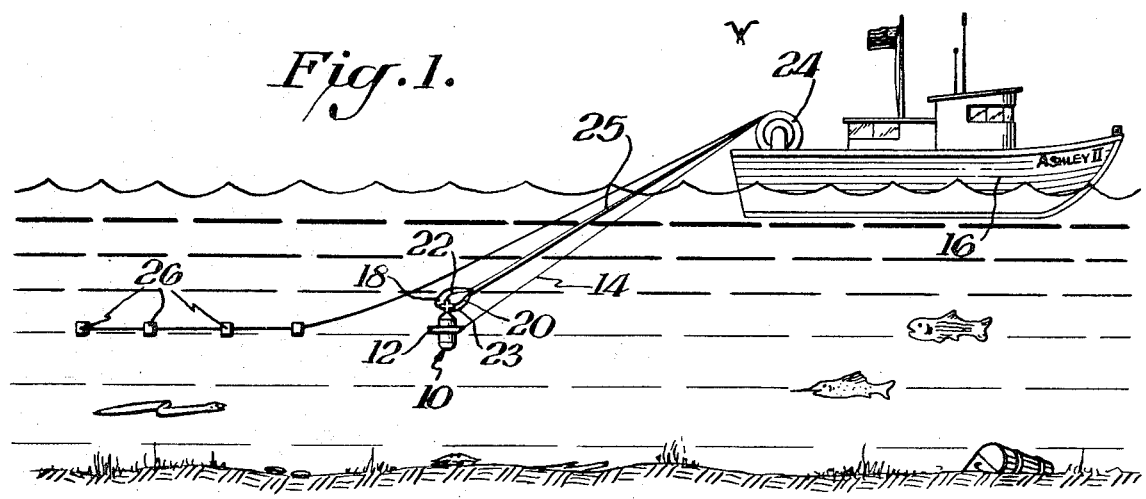
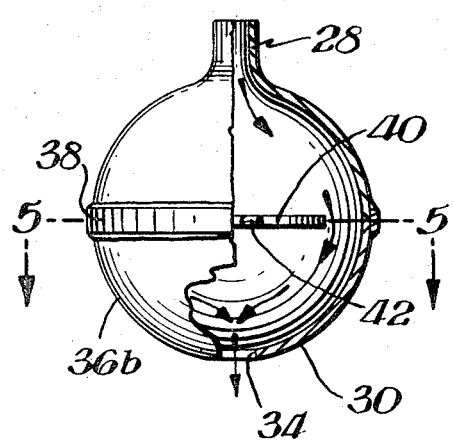
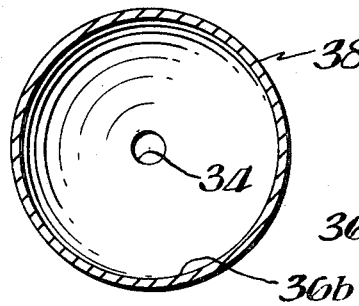
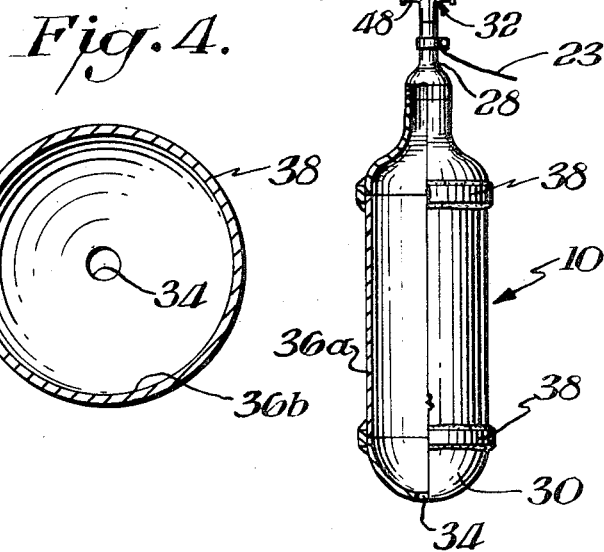
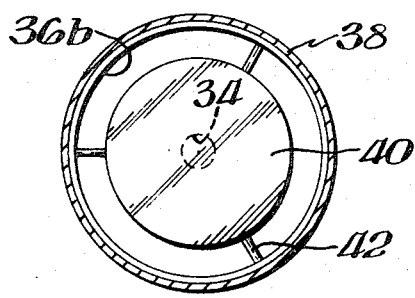
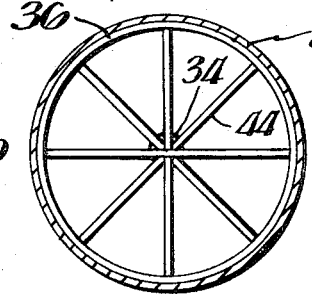
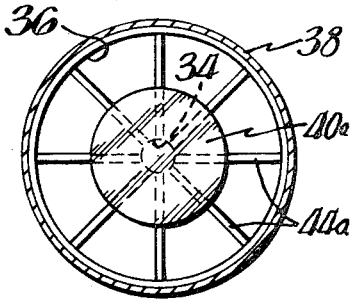

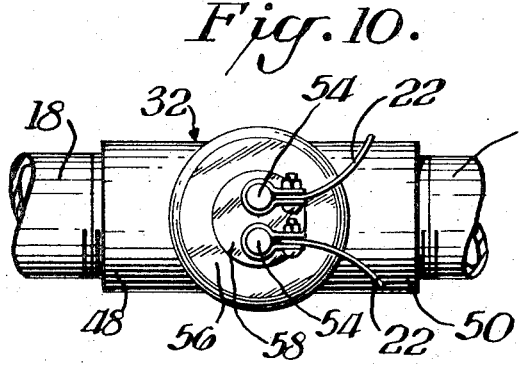
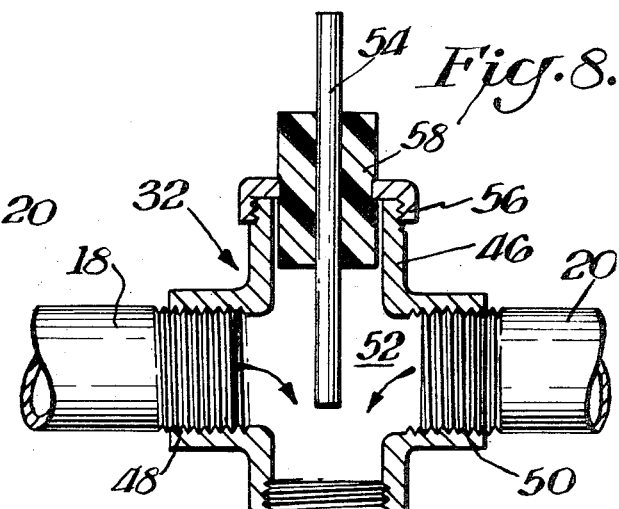
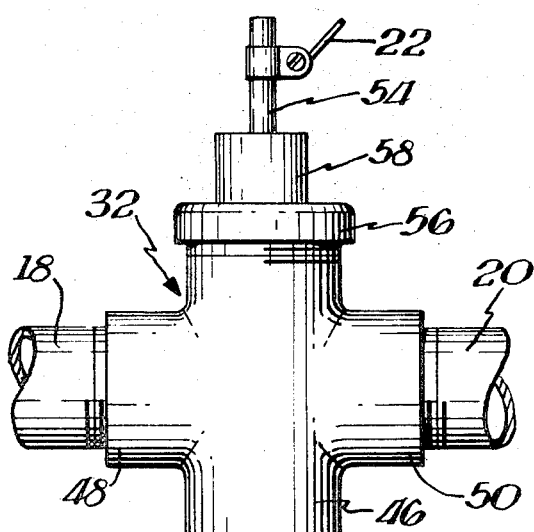
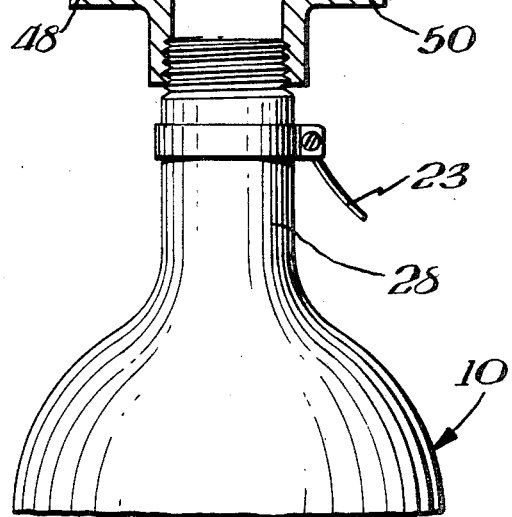
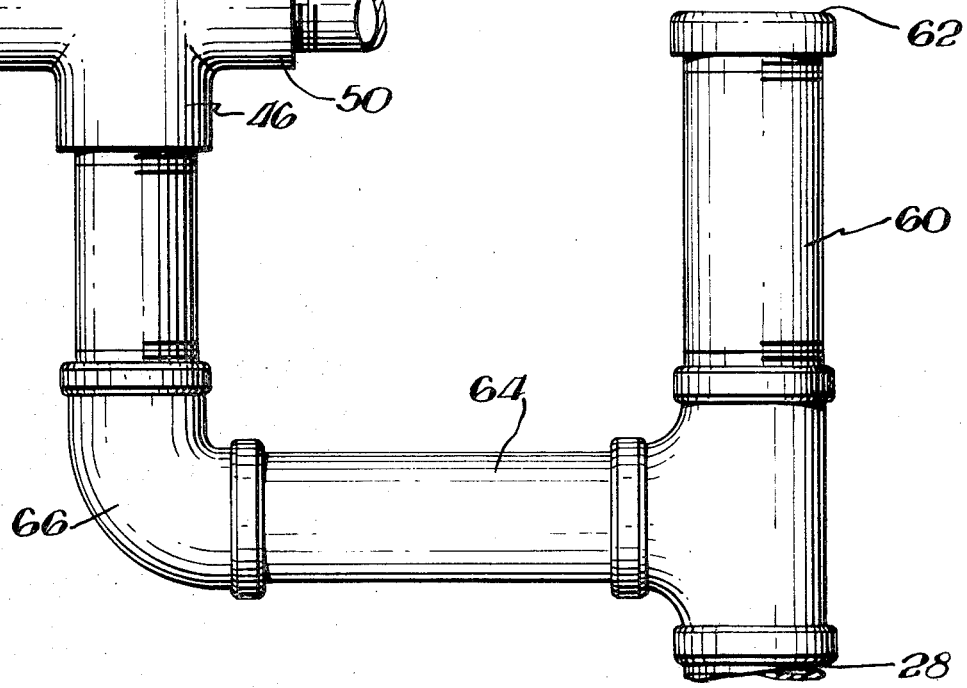

3,730,289

SEISMOGRAPHIC DEVICE

BACKGROUND OF INVENTION

This invention relates to an internal combustion seismic prospecting or surveying device. Many seismic prospecting devices are available. In general, however, these devices are expensive to manufacture while having a varying degree of reliability. Examples of such seismic prospecting or surveying devices are described and illustrated in U.S. Pat. Nos. 2,994,397; 3,064,753; 3,256,952; and 3,289,784. The prior art devices such as exemplified by the above patents generally include complicated arrangements for producing a shock wave which is detected by hydrophones located some distance from the detonation device. Generally these devices operate in such a manner that bubble formations result. This in turn creates the need to provide means for delaying subsequent bubble formations so that a large enough shock wave can be produced to provide a reliable reading.

SUMMARY OF INVENTION

An object of this invention is to provide a seismographic surveying or prospecting device which is inexpensive to manufacture without sacrifice to the effectiveness in producing reliable readings from the resultant shock waves.

A further object is to provide such a device which operates without bubble formation.

In accordance with this invention an underwater internal combustion seismographic device for prospecting or surveying without bubble formation comprises a vessel having a constricted orifice with an area of about 5 percent to about 20 percent of the maximum cross-sectional area of the vessel. The combustion gases escape through the orifice and the shock wave used for seismograhic prospecting passes through the wall of the vessel.

The vessel may include means for deflecting the downwardly flowing detonated gas to increase the resultant pulse. Additionally, means may be provided in the vessel to prevent a spinning action of the gas.

In accordance with a further aspect of this invention the detonation occurs by means of a furnace electrode disposed in a shock resistant sleeve located at the juncture or mixing chamber of the pipes or conduits for feeding the individual detonating gases.

THE DRAWINGS

FIG. 1 is an elevational view of the general arrangement including the seismographic device in accordance with this invention;

FIG. 2 is an elevational view partly in section of one form of the device shown in FIG. 1;

FIG. 3 is an elevational view partly in section of another form of the device in accordance with this invention;

FIG. 4 is a cross-sectional plan view of a device similar to that shown in FIG. 3 but without the partition;

FIG. 5 is a cross-sectional plan view taken through FIG. 3 along the line 5—5;

FIGS. 6 and 7 are cross-sectional plan views similar to FIG. 5 showing different embodiments of this invention;

FIG. 8 is an elevational view partly in section showing one form of detonation means usable with this invention;

FIG. 9 is an elevational view showing another form of detonation means in accordance with this invention; and FIG. 10 is a plan view of a portion of the detonation means shown in FIG. 9.

DETAILED DESCRIPTION

FIG. 1 shows the general arrangement wherein the novel seismographic device 10 is mounted in a sled 12 or other suitable device for maintaining the seismographic device 10 in an upright or vertical position. A tow line 14 connects the sled to a surface platform such as craft 16. Connected to the top end of device 10 are suitable gas feed lines 18, 20 and electric power cable 22 and ground line 23. These various lines and cables are disposed in a common tubing 25 mounted upon reel 24. The general arrangement also includes a plurality of detectors 26 such as hydrophones which receive reflections of the shock wave produced by device 10 and which are connected to craft 16.

FIG. 2 shows one form of seismographic device 10 which includes a generally cylindrically formed vessel 36a having a narrow conical top end 28 and a tapered hemispherical bottom end 30. The length to width ratio of vessel 36a is about 4:1 to 1:4. Detonation means 32 are provided at the top end while a constricted orifice 34 is arranged at the bottom end exposed to the surrounding environment. Orifice 34 has a cross-sectional area with respect to its plan view which is about 5 percent to about 20 percent of the maximum cross-sectional plan view area of vessel 36a. Preferably the cross-sectional area of orifice 34 is about 10 percent of the maximum cross-sectional area of vessel 36a. In operation a gas is detonated by detonating means 32 in such a manner that there will be no bubble pulse but there will be an adequate signal. In this respect the detonated gas explodes and sends a shock wave through the wall 30 of vessel 36a. Exploded gas products, however, are prevented from expanding and forming an oscillating bubble. Orifice 34 allows the combustion products to be swept out under their own pressure as well as being forced out by the subsequent charge of fresh gas.

FIG. 3 shows a modified vessel 36b which is generally spherical but which has the same cross-sectional area relationship to orifice 34. It is to be understood that the shape of the vessel may vary. Preferably, however, a shape is used which has a circular cross-section to avoid sharp turns and corners. It is to be further understood that the various auxiliary features which are illustrated for example in the spherical vessel may also be incorporated in a cylindrical or other shaped vessel. Thus FIG. 4 is a cross-sectional plan view of a spherical vessel 36b which is merely provided with an orifice 34 but wherein the interior of the vessel includes no auxiliary devices.

Referring again to FIG. 3 and also in FIG. 5, if desired vessel 36b may be formed by a pair of hemispheres joined together by band 38. Advantageously a solid partition 40 is mounted in the equatorial plane of the vessel by any suitable means such as spaced supports or legs 42 so that the periphery of partition 40 is spaced from the wall of vessel 36b. In this manner, as best illustrated in FIG. 3, the downwardly flowing detonated gas is deflected toward the inner surface of wall 36b causing streams of the gas to strike each other in the bottom end of the vessel to thereby increase the pulse or shock wave.

FIG. 6 shows another auxiliary device incorporated in vessel 36. As indicated therein a plurality of radial vanes 44 are disposed along the vertical axis of vessel 36 and extend completely to the inner surface of the vessel wall. In this manner the vanes act to prevent a spinning action which might otherwise occur with the detonated gas.

FIG. 7 shows another form of this invention wherein the partition and vanes are combined. Thus as illustrated therein partition 40a is provided coaxial with vessel 36 in its equatorial plane and which is spaced from the inner surface of the vessel wall. Vanes 44a serve the dual function of not only mounting partition 40a in place but also preventing spinning action of the gas similar to vanes 44 of FIG. 6.

FIGS. 8–10 show various aspects of the detonation means 32. As illustrated in FIG. 8, for example, a suitable fitting 46 is provided with a pair of oppositely disposed conduits or extensions 48, 50 which are supplied with, for example, propane from line 18 and oxygen from line 20, respectively, or any other suitable gases which compose the detonating gas mixture. The gases are mixed in the juncture area or mixing chamber 52. The mixture ratio of propane to oxygen may be 2:7, although other ratios may be used. One or more furnace electrodes 54 extend into juncture area 52 to detonate the mixed gas by ignition from electrical power cable 22. Obviously other ignition means such as spark plugs may also be used in place of electrodes 54. Although a single electrode may be quite satisfactory for igniting the gas, a pair of electrodes 54, 54 adds a degree of safety thereby assuring that ignition will take place. As shown in FIG. 8 the upper end of fitting 46 is closed by apertured cap 56. The aperture of this cap is in turn closed by a shock resistant sleeve 58 which effectively holds electrode 54 in place. If desired cap 56 may be omitted and sleeve 58 may close fitting 46. An advantageous material for sleeve 58 is fluorinated ethylene-propylene resin (FEP resin) such as is commercially known as Teflon (registered trademark of E. I. du Pont de Nemours & CO.). This material is particularly suitable because of its dielectric characteristics and because it is sufficiently tough to be shock resistant.

FIG. 9 shows a modified form of this invention wherein the upper end 28 of vessel 36 includes a nipple 60 which is closed by cap 62. Detonation means 32 is arranged offset or displaced from upper end 28 and communicates with the upper end through intermediate passageway 64 which includes elbow section 66.

As is apparent the various detonation means and the various vessel shapes may be used interchangeably with or without the inclusion of the partition and/or spokes. The resultant device is economical to manufacture without sacrifice to the reliability of its results.

What is claimed is:

1. An underwater seismographic device for prospecting without the use of bubble formation comprising a vessel having a top end and a bottom end, means for feeding a detonation gas to said top end, detonation means at said top end for detonating said gas, constricted orifice means at said bottom end exposed to the surrounding environment for permitting escape of the combustion products, said constricted orifice means being confined to said bottom end and said gas feeding means being confined to an isolated portion of said top end and said vessel being otherwise imperforate, said gas feeding means being constructed to prevent communication thereof with the surrounding water when said device is in use, and said constricted orifice means having a cross-sectional plan view area taken through said bottom end of about 5 percent to about 20 percent of the maximum cross-sectional plan view area taken above said bottom end of said vessel.

2. An underwater seismographic device for prospecting without the use of bubble formation comprising a vessel having a top end and a bottom end, means for feeding a detonation gas to said top end, detonation means at said top end for detonating said gas, constricted orifice means at said bottom end exposed to the surrounding environment for permitting escape of the combustion products, said constricted orifice means having a cross-sectional plan view area taken through said bottom end of about 5 percent to about 20 percent of the maximum cross-sectional plan view area taken above said bottom end of said vessel, and a solid partition being disposed in a plane perpendicular to the vertical axis of said vessel and spaced from the wall of said vessel.

3. An underwater seismographic device for prospecting without the use of bubble formation comprising a vessel having a top end and a bottom end, means for feeding a detonation gas to said top end, detonation means at said top end for detonating said gas, constricted orifice means at said bottom end exposed to the surrounding environment for permitting escape of the combustion products, said constricted orifice means having a cross-sectional plan view area taken through said bottom end of about 5 percent to about 20 percent of the maximum cross-sectional plan view area taken above said bottom end of said vessel, and a plurality of radial vanes being disposed in vertical planes with each vane extending along the axis from the vertical axis of said vessel and to the wall of said vessel.

4. A device as set forth in claim 3 wherein a solid partition is disposed in a plane perpendicular to said vertical axis with said vanes attached to said partition.

5. A device as set forth in claim 4 wherein said orifice means has a cross-sectional plan view area of about 10 percent of the maximum cross-sectional plan view area of said vessel, and said vessel is substantially spherical.

6. A device as set forth in claim 4 wherein said means for feeding said gas comprises a pair of oppositely disposed conduits for feeding the individual gas components to a juncture area, said detonation means including electrode means extending into said juncture area, a tubular extension above said juncture area, a shock resistant sleeve fitting in said tubular extension, and said electrode means being mounted in said sleeve.

7. A device as set forth in claim 6 wherein said sleeve is made from a FEP resin.

8. A device as set forth in claim 7 wherein an inlet is in said top end, and said juncture area is coaxial with said inlet.

9. A device as set forth in claim 7 wherein an inlet is in said top end, said juncture area being axially displaced from said inlet and communicating with said inlet through an intermediate passageway.

10. A device as set forth in claim 7 including a sled connected to said vessel for maintaining said vessel vertical, a line connected said sled to a surface platform, a plurality of shock wave detectors remote from said vessel, and connecting means connecting said detectors to said surface platform.

11. A device as set forth in claim 4 wherein said vessel is substantially cylindrical, and said top end being conical.

12. A device as set forth in claim 11 wherein said orifice means has a cross-sectional plan view area of about 10 percent of the maximum cross-sectional plan view area of said vessel, and the length to width ratio of said vessel is between about 4:1 and 1:4.

13. A device as set forth in claim 4 wherein said vessel is substantially cylindrical, and both of said top end and said bottom end being conical.

14. A device as set forth in claim 4 wherein said vessel is substantially cylindrical, and both of said top end and said bottom end being hemispherical.

* * * * *